United States Patent [19]

Pendergraft

[11] Patent Number: 4,871,521

[45] Date of Patent: Oct. 3, 1989

[54] SULFUR RECOVERY PROCESS USING METAL OXIDE ABSORBENT WITH IMPROVED PURGE

[75] Inventor: Paul T. Pendergraft, Tulsa, Okla.

[73] Assignee: Amoco Corporation, Chicago, Ill.

[21] Appl. No.: 218,526

[22] Filed: Jul. 6, 1988

Related U.S. Application Data

[63] Continuation of Ser. No. 98,775, Sep. 18, 1987, abandoned, which is a continuation of Ser. No. 902,248, Aug. 28, 1986, abandoned.

[51] Int. Cl.$^4$ .................. C01B 17/16; C01B 31/20; C01B 17/02
[52] U.S. Cl. .................. 423/230; 423/244; 423/574 R
[58] Field of Search .................. 423/230, 244, 574 R

[56] References Cited

U.S. PATENT DOCUMENTS 4,533,529  8/1985  Lee .................. 423/574 R

Primary Examiner—John Doll
Assistant Examiner—Lori S. Freeman
Attorney, Agent, or Firm—L. Wayne White; Fred E. Hook

[57] ABSTRACT

Sulfur species are removed from a Claus plant tail gas stream by contacting with ZnO producing ZnS which is regenerated to ZnO by dilute $O_2$. Following regeneration, fresh regenerated ZnO in one ZnO absorber is purged with an effective reducing gas stream producing $SO_2$ emissions while another ZnO absorber is downstream operating under effective absorption conditions for removing thus produced $SO_2$ from the first ZnO absorber effluent.

12 Claims, 3 Drawing Sheets

Absorber Effluent Concentration With Prior Purge

SULFUR RECOVERY PROCESS USING METAL OXIDE ABSORBENT WITH IMPROVED PURGE

This is a continuation of copending application Ser. No. 98,775 filed on Sept. 18, 1987, now abandoned, which is a continuation of copending application Ser. No. 902,248 filed on Aug. 28, 1986, now abandoned.

FIELD OF THE INVENTION

The invention relates to the removal of sulfur and sulfur compounds from gaseous streams containing such compounds. In one aspect the invention relates to the removal of sulfur compounds including $H_2S$ (hydrogen sulfide) and $SO_2$ (sulfur dioxide) from Claus plant tail gas. In another aspect, the invention relates to the use of solid high surface area contact materials (absorbents), for example, ZnO-based (zinc oxide-based) absorbents, for absorbing sulfur compounds such as $SO_2$ and $H_2S$. In a further aspect, the invention relates to preventing increased $SO_2$ emissions from appearing in plant emissions when treating freshly regenerated ZnO absorbent with a reducing gas stream under conditions for reducing the time required.

SETTING OF THE INVENTION

A developing area of sulfur recovery technology is that of tail gas cleanup, that is, of removing trace quantities of sulfur compounds from gaseous effluent streams (tail gas) of Claus process sulfur recovery plants. Tail gas may contain substantial amounts of sulfur compounds. Tailgas from Claus or extended Claus plants (having at least one Claus low temperature adsorption reactor) typically can contain about 0.5-10% of the sulfur present in feed to the plant as elemental sulfur, $H_2S$, $SO_2$, COS (carbonyl sulfide), $CS_2$ (carbon disulfide), and the like. Tailgas cleanup processes remove at least part of such residual sulfur compounds from Claus tail gas.

In prior U.S. Pat. No. 4,533,529, Claus tail gas is contacted with ZnO (zinc oxide) in an absorber reducing average overall emission levels from the absorber to less than 250 ppm sulfur species. It is desirable, however, and necessitated by certain environmental requirements, that not only average but instantaneous emissions be continuously maintained at a very low level.

It has been discovered, after ZnS (zinc sulfide) is regenerated to ZnO, that an increase in $SO_2$ emissions occurs from the absorber upon returning regenerated ZnO to absorption where it is contacted with reducing gases. These $SO_2$ emissions interfere with continuously maintaining instantaneous emissions at a very low level.

Accordingly, there is provided a process capable of diminishing such an increase in $SO_2$ emissions and maintaining effluent from the absorber at a continuous low level of emissions.

SUMMARY OF THE INVENTION

The invention comprises a process for continuously removing sulfur compounds, for example, $H_2S$ and $SO_2$, from a Claus plant gaseous effluent stream to an extremely low level. In this process, the sulfur compounds are removed in the presence of an absorbent based on ZnO as active absorbent (herein referred to as ZnO or ZnO-based absorbent) to produce a laden, sulfided absorbent (ZnS) and a purified gaseous stream (absorber effluent) continuously having on the order of 250 ppm or less total residual $H_2S$ and $SO_2$.

There is provided a new and advantageous combination of steps for preventing higher emissions of sulfur dioxide from freshly regenerated ZnO absorbent, the ZnO absorbent having been regenerated in the presence of molecular oxygen and sulfur dioxide, from appearing in effluent from the plant. The invention comprises a new and advantageous combination of steps for use in a method for absorbing at least $H_2S$ from a stream by sulfidization of ZnO producing ZnS, the ZnS then being regenerated to ZnO, producing sulfur dioxide ($SO_2$) in the presence of $O_2$ and returned to absorbing $H_2S$ from the stream. The new and advantageous combination of steps comprises (1) following regeneration of ZnS to ZnO, passing the stream containing at least $H_2S$ in contact with thus regenerated ZnO, producing effluent comprising $SO_2$ and (2) passing the effluent comprising $SO_2$ in contact with ZnO under conditions, including temperature and composition, for removing $SO_2$ in the presence of the ZnO.

In accordance with another aspect of the invention, the invention comprises a new and advantageous combination of steps for use in a method for removing at least sulfur dioxide $SO_2$ from a stream comprising $SO_2$ and reducing species effective for converting $SO_2$ to $H_2S$ in the presence of an effective ZnO absorbent producing ZnS. The ZnS is then regenerated to ZnO, producing $SO_2$, in the presence of $O_2$, and then returned to absorbing at least $SO_2$ from the stream. The new and advantageous combination of steps comprises: (1) following regeneration of ZnS to ZnO, passing a stream comprising reducing species in contact with thus regenerated ZnO, producing effluent comprising $SO_2$ therefrom, and (2) passing the effluent comprising $SO_2$ in contact with ZnO under conditions including temperature and gas composition for removing $SO_2$ therefrom.

In accordance with further aspects of the invention, steps (1) and (2) are continued for a period of time for reducing $SO_2$ levels in the effluent from the plant to less than about 250 ppm, and more preferably, to less than about 50 ppm.

In a further aspect, a process for the recovery of sulfur from a $H_2S$ containing gaseous stream comprises converting $H_2S$ to elemental sulfur by the Claus reaction in a Claus plant comprising a Claus thermal reaction zone (furnace) and at least one Claus catalytic reaction zone and producing a tail gas comprising significant amounts of both $H_2S$ and $SO_2$. As used herein, significant amounts of $H_2S$ and $SO_2$ means that each is present in excess of 250 ppm. The tail gas can then be treated to remove each of $H_2S$ and $SO_2$ by reaction with ZnO in a first absorption zone containing ZnO (functioning as an absorber) in the presence of reducing species for converting substantially all sulfur species in the tail gas to $H_2S$, producing ZnS and absorber effluent. The resulting ZnS can be regenerated, that is, returned to the active ZnO form of the absorbent, by introducing $O_2$ (molecular oxygen) into a second absorption zone (functioning as a regenerator) and regenerating the zinc sulfide to ZnO, producing regeneration effluent. Regeneration effluent comprising $SO_2$ is returned to the Claus plant. Following regeneration of absorbent (converting ZnS to ZnO) in the second absorption zone, the tail gas is introduced into the second absorption zone, producing ZnS and absorber effluent which, during an initial emissions period, contains an elevated level of $SO_2$. Effluent from the second absorption zone is introduced into the first absorption zone operating under absorption conditions during the emissions period and the increased level of SO₂ is removed by the ZnO in the first absorption zone in the presence of reducing species. Thus, purging in accordance with the invention is accomplished by beginning absorption in a freshly regenerated absorber zone and passing effluent from the freshly regenerated absorber zone to another absorption zone where the elevated levels of SO₂ are removed to an acceptable level. After the emissions period, the first absorption zone can be removed from absorption function and regenerated by introducing O₂ thereinto and regenerating the ZnS to ZnO, producing regeneration effluent. The process is additionally characterized by the fact that the purge period during which effluent from a freshly regenerated absorber is provided to a downstream absorber on absorption, lasts for a period of time effective for removing at least 10% of an increase in SO₂ emissions from the freshly regenerated absorber during an emissions period at the start of absorption following interchanging of the absorber and the regenerator.

The invention accordingly comprises the processes and systems, together with their steps, parts, and interrelationships which are exemplified in the present disclosure, and the scope of which will be indicated in the appended claims.

Figure 1:
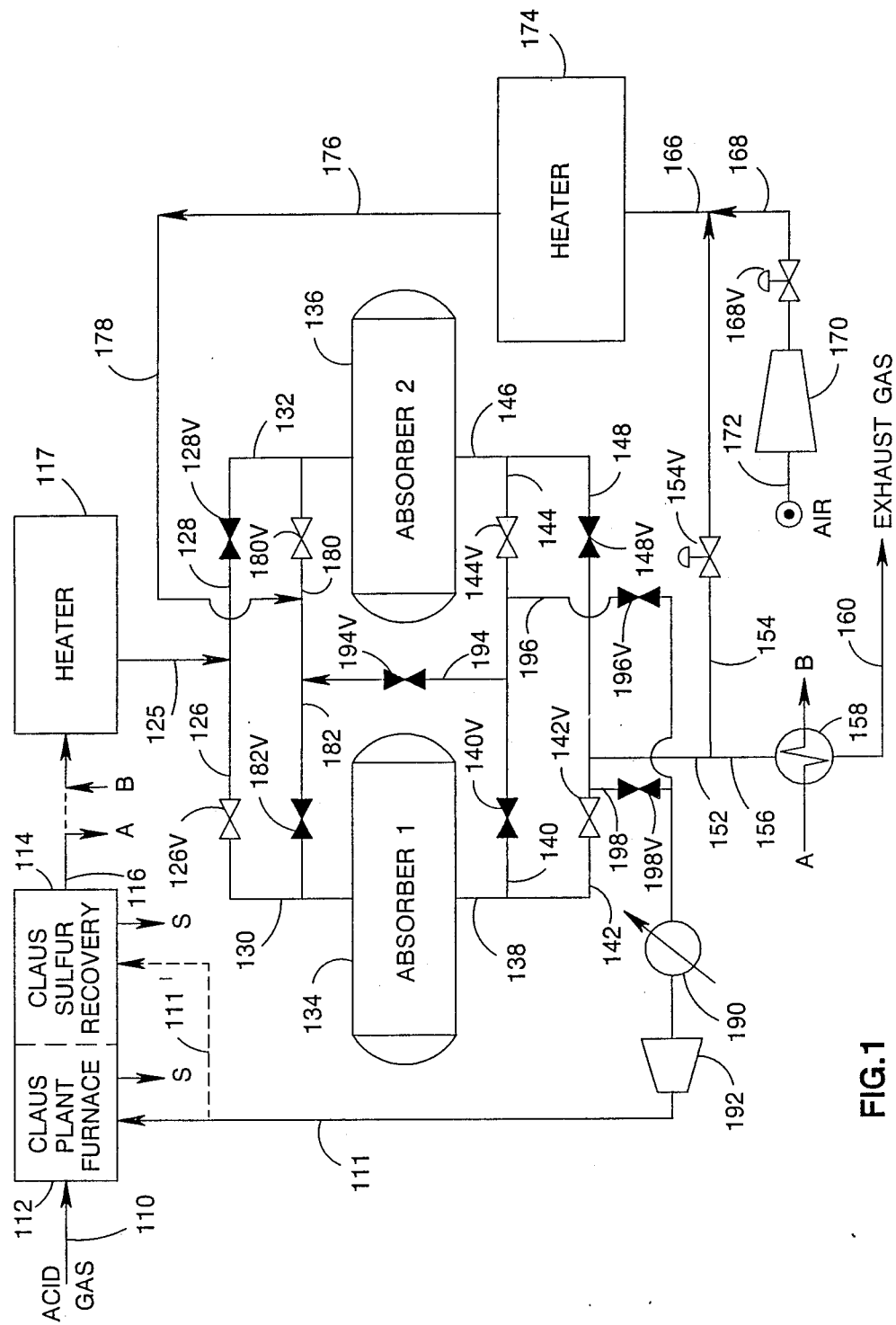
FIG. 1 shows schematically apparatus for practicing the invented process.

Sulfur is recovered from an H₂S-containing stream by introducing the stream into a Claus plant comprising a thermal reaction zone (Claus furnace) and at least one Claus catalytic reaction zone. The Claus thermal reaction zone can be, for example, a Claus muffle furnace, a fire tube (tunnel) furnace, or the like. Generally, the Claus thermal reaction zone functions for converting a portion of H₂S, preferably about ⅓, to SO₂ for thermal or catalytic Claus reaction with H₂S to form elemental sulfur.

In the Claus furnace, the H₂S-containing gas and oxidant can be reacted at a temperature generally in the range of about 1800°–2600° F. The effluent from the Claus thermal reaction zone can be cooled, for example, in a waste heat boiler, and optionally passed through a sulfur condenser to condense and remove liquid sulfur.

The gaseous effluent can then be fed into a Claus catalytic reaction zone operated above the sulfur dewpoint having an inlet temperature in the range, for example, of about 350°–650° F. In the Claus high temperature catalytic reactor, sulfur is formed by the Claus reaction (shown below) in the presence of an effective Claus reaction-promoting catalyst such as alumina or bauxite:

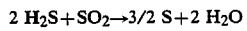

$$2\ H_2S + SO_2 \rightarrow 3/2\ S + 2\ H_2O$$

Gas containing elemental sulfur vapor can be continuously removed from the reactor and provided to a sulfur condenser where sulfur is condensed and removed as a liquid. Gaseous effluent from the sulfur condenser can be reheated, if desired, and passed to further high temperature Claus reactors and associated sulfur condensers as is known in the art. The effluent gas from the final sulfur condenser is then the Claus plant tail gas. Where a Claus low-temperature adsorption zone is used, it may or may not be followed by a sulfur condenser. Thus, adsorber effluent may be the Claus plant tail gas.

Preferably, the Claus plant tail gas is from a Claus plant which includes at least on Claus catalytic reactor operated under conditions, including temperature, effective for depositing a preponderance of the formed sulfur on Claus catalyst therein. Such a Claus low temperature adsorption zone can be broadly operated in the range of from about 160° to about 330° F., preferably in the range of from about 260°–300° F.

The operation of such Claus plants having Claus furnaces, Claus high temperature reactors, and Claus low temperature adsorption reactors is well known in the art and need not be further described here. See, for example, U.S. Pat. Nos. 4,044,114; 4,426,369; 4,430,317; 4,473,541; 4,482,532; 4,483,844; 4,507,275; 4,508,698, and numerous others.

The tail gas from such Claus plants comprises H₂S, SO₂, organic sulfides, and reducing species such as H₂ and CO. Tailgas from plants having only Claus high temperature reactors can contain H₂S in the range of about 0.4 to about 4 mol %, SO₂ in the range of about 0.2 to about 2 mol %, water in the range of about 20 to about 50 mol % (typically 30–40 mol %), as well as organic sulfides such as COS and CS₂, and elemental sulfur. Where the tail gas is from a plant having one or more Claus low temperature adsorption reactors, the tail gas may have equivalent of about 0.4 mol %, preferably about 0.2 mol %, or less single sulfur species.

Use of at least one Claus low-temperature adsorption reactor is preferable in part because such reactors remove significant amounts of organic sulfides, such as COS, CS₂, and the like from the gas in process. These organic sulfides are not removed by sulfur recovery processes such as the IFP process described in DeZael, et al., U.S. Pat. No. 4,044,114 (1977) which forms elemental sulfur in the presence of polyethylene glycol and sodium benzoate. See, e.g., Kohl and Riesenfeld, Gas purification, pages 491–493 (3d Ed. 1979).

For the same reason, it is also preferred to operate at least one Claus high temperature reactor so that the effluent has a temperature in the range from about 550° to 700° F., preferably from about 600° to 650° F. to diminish the amount of organic sulfides in the effluent. See, e.g., Kunkel, et al., U.S. Pat. No. 4,035,474 (1977).

Both $H_2S$ and $SO_2$, as well as organic sulfides, can be concurrently removed in the absorber containing ZnO in the presence of reducing species for reducing the $SO_2$ and other sulfur species to $H_2S$. It is preferred to operate the Claus plant so that about a 2:1 ratio of $H_2S:SO_2$ is maintained in the Claus plant tail gas to maximize sulfur recovery in the Claus plant and to minimize the amount of sulfur remaining in the Claus plant tail gas to be removed by the ZnO absorbers. Such ratio can be maintained by control systems well known in the art and need not be further described here. By reducing the organic sulfide and other sulfur content in the feed to the ZnO absorbers, the volume of regeneration effluent returned to the Claus plant can be reduced or diminished. An effect of operating at about a 2:1 ratio, however, is that quantities of both $H_2S$ and $SO_2$ are present in the Claus plant tail gas, i.e., more than about 250 ppm of each of $H_2S$ and $SO_2$.

The reducing species, for example, $H_2$ and/or CO, required for conversion of sulfur compounds in the tail gas to $H_2S$ can be obtained from any convenient source including that present in the tail gas as $H_2$, or available from a donor such as CO, which can react with water to yield $H_2$. $H_2$ is preferred, whether contained in the tail gas or internally generated or provided from an outside source.

The Claus plant tail gas can contain sufficient reducing species where the Claus plant is appropriately operated. For most Claus plants, by operating the Claus furnace so that slightly less air is utilized than that required for producing Claus plant tail gas having a 2:1 $H_2S:SO_2$ ratio and by insuring that the tail gas leaving the final sulfur condenser of the Claus plant has a low level of residual elemental sulfur, the Claus plant tail gas will contain sufficient reducing species. By further reducing the amount of oxidant introduced into the Claus furnace or by other methods which will be apparent to persons skilled in the art, the amount of reducing species can be further increased if desired.

The Claus plant tail gas having sufficient reducing species to reduce all sulfur compounds therein to $H_2S$ can be heated, for example, directly by means of direct fired heaters, or indirectly by heat exchange, for example, with other process streams such as absorber effluent, to produce a heated Claus plant tail gas effluent stream having a temperature effective for removal of each of $H_2S$ and $SO_2$ in the presence of a solid particulate preferably high surface area (for example, pellets, extrudates, and the like) ZnO absorbent effective for such removal. This removal of each of $H_2S$ and $SO_2$ is considered to proceed by hydrogenation of sulfur compounds present in the tail gas to $H_2S$ in the presence of ZnO, ZnO in this respect acting as a catalyst, followed by absorption of the thus-formed $H_2S$ by the ZnO by sulfiding the ZnO to ZnS, the ZnO acting as an absorbent. Preferably, the Claus plant tail gas is heated to above about 1000° F. As illustrated in EXAMPLE I below, by operating at these absorber temperatures, a hydrogenation reactor is not required before removal of sulfur compounds other than $H_2S$ in the absorber. When operating at temperatures above about 1000° F., $H_2S$ emissions and the reduction of ZnO to Zn vapor under a reducing environment can set a practical upper limit on the absorption temperature which will be used. Currently for these reasons it may be appropriate that the upper limit during absorption be about 1200° F. Higher temperatures can also be used. Absorber operation above about 1000° F. is preferred because such higher temperatures favor higher absorption capacity of the absorber and the hydrogenation reactor can be eliminated. Also, since absorption and regeneration will then be conducted at approximately the same inlet temperature (1000°–1200° F.), temperature stress on equipment can be reduced. As a result, there will be no significant heating and cooling periods. Hence, the time available for regeneration will be increased and the rate of regeneration effluent returned to the Claus plant can be decreased.

While a first absorption zone is functioning as an absorber, a second absorption zone can be functioning as a regenerator.

As used herein, and in the claims, the terms "absorbent", "ZnO", "ZnO absorbent", and the like shall mean an absorbent effective for removal of both $H_2S$ and $SO_2$ in the presence of reducing species. A major portion of the active absorbent, for example, fifty percent or more, is in the form of ZnO which is the active form. The absorbent can also contain binders, strengtheners, and support materials, for example, alumina ($Al_2O_3$), calcium oxide (CaO) and the like. Zinc sulfide and zinc sulfate can be used as starting materials and treated with heat and/or oxygen to produce an active ZnO sorbent. Other suitable starting materials can also be used. The ZnO absorbent is effective for absorbing $H_2S$ by undergoing sulfidization to produce a laden (sulfided) absorbent; simultaneously, if desired, hydrogenation of other sulfur compounds to $H_2S$ followed by such absorption can occur. Preferably, the ZnO absorbent is capable of a high level of removal of sulfur compounds and is relatively insensitive to water vapor.

Particularly preferred are ZnO absorbents which are thermally stable, regenerable, and capable of absorbing substantial amounts of sulfur compounds. An acceptable absorbent is United Catalysts, Inc., G72D Sulfur Removal Catalyst, available from United Catalysts, Inc., Louisville, Ky., having the following chemical composition and physical properties:

| CHEMICAL COMPOSITION | | | |
|---|---|---|---|
| | wt % | Trace Metal Impurities | wt % |
| ZnO | 90.0 ± 5% | Pb | <0.15 |
| Carbon | <0.20 | Sn | <0.005 |
| Sulfur | <0.15 | As | <0.005 |
| Chlorides | <0.02 | Hg | <0.005 |
| $Al_2O_3$ | 3–7 | Fe | <0.1 |
| CaO | 0.5–3.0 | Cd | <0.005 |
| PHYSICAL PROPERTIES | | | |
| Form | Pellets | | |
| Size | 3/16 in. | | |
| Bulk Density | 65 ± 5 lbs/ft3 | | |
| Surface Area | 35 m2/g minimum | | |
| Pore Volume | 0.25–0.35 cc/g | | |
| Crush Strength | 15 lbs minimum average | | |

Representative chemical reactions considered to occur during absorption, regeneration and purging are shown below:

| During Absorption: | |
|---|---|
| $H_2S + ZnO \rightarrow ZnS + H_2O$ | (1) |
| $COS + ZnO \rightarrow ZnS + CO_2$ | (2) |
| $CS_2 + 2ZnO \rightarrow 2ZnS + CO_2$ | (3) |
| $SO_2 + 3H_2 \rightarrow H_2S + 2H_2O$ | (4) |
| $H_2S$ + Sulfated Absorbent $\rightarrow SO_2$ + ZnO Absorbent | (5) |

During absorption, $H_2S$, COS and $CS_2$ in the stream can react with ZnO to form ZnS as shown in Eqs. (1) to (3). $SO_2$ can react directly with $H_2$ to form $H_2S$ as shown by Eq. (4), and the resulting $H_2S$ can then react with ZnO. COS and $CS_2$ may also be hydrogenated and/or hydrolyzed to $H_2S$ before absorption by ZnO. When elements in the absorbent such as zinc, calcium, aluminum, or other elements become sulfated during regeneration, $SO_2$ may be produced during absorption as indicated by Eq. (5) due to the presence of effective reducing species in the absorber feed. Sulfation is reversed by purging the regenerated absorbent with effective reducing species before returning regenerated ZnO to absorption and providing the produced $SO_2$ to a downstream ZnO absorption zone.

| During Regeneration: | |
|---|---|
| $ZnS + 3/2\ O_2 \rightarrow ZnO + SO_2$ | (6) |
| Absorbent + $SO_2 + O_2 \rightarrow$ Sulfated Absorbent | (7) |

Regeneration of sulfided absorbent is effected by oxidizing ZnS to ZnO as shown by Eq. (6). Absorbent sulfation can also occur, as shown by Eq. (7) during regeneration in the presence of $O_2$ and $SO_2$. Temperature rise during regeneration can suffice if unchecked to destroy both the physical integrity and the chemical activity of the absorbent as well as to exceed metallurgical limits of preferred materials of construction. Consequently, temperature rise during regeneration is preferably controlled to less than about 1500° F.

| During Purging: | |
|---|---|
| Sulfated Absorbent + $H_2 \rightarrow$ Absorbent + $SO_2 + H_2O$ | (8) |
| Sulfated Absorbent + CO $\rightarrow$ Absorbent + $SO_2 + CO_2$ | (9) |
| Sulfated Absorbent + $H_2S \rightarrow$ Absorbent + $SO_2 + H_2O$ | (10) |

Purging in accordance with the invention is accomplished by introducing Claus plant tail gas feed to an absorption zone into the freshly regenerated reactor while another ZnO absorber is downstream operating under absorption conditions for removing $SO_2$ produced. Such Claus plant tail gas contains $H_2$, CO, and $H_2S$ and therefore contains the effective reducing species for causing $SO_2$ emissions.

Reduction of the sulfated absorbent will occur at temperatures above about 1000° F. in the presence of $H_2$, CO or other reducing species such as $H_2S$. Reduction of the sulfated absorbent is not effected at lower temperatures such as 900° F. or lower or in the absence of such effective reducing species.

Methane is not effective in reasonable periods of time under process conditions for causing the production of $SO_2$ from freshly regenerated ZnO. Further, an inert gas will not cause such $SO_2$ emissions to occur. Upon switching to absorption, however, the freshly regenerated, sulfated ZnO absorbent will be contacted with a stream containing the effective reducing species ($H_2$, CO, and $H_2S$) and $SO_2$ emissions will occur. Accordingly, for causing $SO_2$ emissions, during the purging, it is essential that effective reducing species be present and that the temperature be greater than about 1000° F., but preferably not much greater than about 1200° F. since significant losses of zinc can occur above that temperature in the presence of reducing species. Nevertheless, higher temperatures can be used.

The absorber zone containing ZnO can comprise at least a first absorption zone (functioning as an absorber) and a second absorption zone (functioning as regenerator) and the process can comprise contacting $H_2S$ with absorbent in the absorber to remove it and other sulfur species producing a laden absorbent and absorber effluent lean in sulfur species. Absorption can be continued for a period of time (absorption period), preferably less than that required for $H_2S$ breakthrough from the absorber. For practical purposes, $H_2S$ breakthrough can be defined as occurring when the $H_2S$ concentration in the absorber effluent stream reaches a preset low value, such as for example, 50 ppm $H_2S$. As shown in EXAMPLE I and II below, breakthrough time and absorption capacity for an absorber increase with increasing absorber temperature. Concurrently with absorption in the absorber, laden absorbent in the regenerator can be regenerated by introducing a regeneration stream comprising dilute $O_2$ thereinto at a temperature effective for converting laden sulfided absorbent to active absorbent. Regeneration effluent comprising $SO_2$ is returned from the regenerator to the Claus plant, for example, to the thermal reaction zone or to a downstream Claus catalytic reaction zone. Thereafter, the tail gas can be introduced into the second absorption zone functioning as absorber and the first absorption zone can for a period, receive effluent from the second absorption zone. During this purge period which is characterized by increased emissions of $SO_2$ from the freshly regenerated absorbent, contacting of freshly regenerated ZnO with the tail gas which comprises $H_2S$, $H_2$, and CO, causes the production of $SO_2$ which can be removed by the downstream first absorption zone operating as an absorber. Thereafter, $O_2$ can be introduced into the first absorption zone for regeneration, and the process can be continued and repeated for the regenerated ZnO in the first absorption zone.

During regeneration, a temperature rise of about 145° F. occurs for each mol percent of oxygen consumed in converting ZnS back to ZnO. To avoid exceeding metallurgical limits of nonrefractory lined vessels and to maintain absorbent physical and chemical integrity during regeneration, a maximum of about 3.5 mol % oxygen can be used during regeneration when the regeneration stream is introduced at about 1000° F., and a maximum of about 2.75 mol % $O_2$ when the regeneration stream is introduced at about 1100° F. Thus, preferably oxygen is introduced during regeneration at a concentration of about 0.4 or less to about 3.5 mol %, more preferably at about 1 to about 2.75 mol %. Due to the exothermic nature of the regeneration reaction, suitable methods for diluting the oxygen can be used. Where metallurgical limits are not controlling, the maximum temperature during regeneration can be as high as about 2100° F.

Suitable methods for diluting the oxygen during regeneration include the following: (1) a portion of the regenerator effluent can be recycled back to the regenerator to dilute $O_2$ in the regeneration stream; (2) a portion of absorber effluent can be used to dilute $O_2$ in the regeneration stream.

When method (1) is employed, the $SO_2$ level during regeneration in the regenerator is higher than when method (2) is used since $SO_2$ produced during regeneration is recycled to the regenerator. Reference to EXAMPLE VI indicates that higher $SO_2$ levels during regeneration favors sulfation of the absorbent. It has also been found when method (1) is used that $SO_2$ emissions are larger upon returning to absorption, and/or that a longer purge time can be required to eliminate an increase in $SO_2$ emissions following return to absorption. Accordingly, method (2) is preferred for diluting the $O_2$ to a suitable concentration for regeneration. However, in accordance with the invention, absorber feed is used for producing $SO_2$ from freshly regenerated ZnO absorbent in one absorber while another ZnO absorber is downstream operating under absorption conditions for removing the produced $SO_2$. Hence method (1) can also be used since the higher level of reducing compounds present in the absorber feed will shorten the purge period in accordance with the invention. Further, by using absorber feed for purging, purging and the start of absorption for an absorber occur concurrently.

The flow rate during regeneration is preferably a rate sufficient to complete regeneration and purging as described herein of a ZnO absorber during effective absorption in another ZnO absorber. In this way, only two absorption zones will be required. Some time can also be allowed for the contingency of process upsets (slack time). Preferably, the flow rate during regeneration is such that the period during which regeneration is occurring is equal to the period during which absorption is occurring less the period required for purging as herein set forth and such slack time.

As indicated, regeneration effluent comprising $SO_2$ is returned from the regenerator to the Claus plant for conversion of the $SO_2$ to elemental sulfur which is removed from the gas in process. Dilution of the $O_2$ using absorber effluent minimizes purge time and/or magnitude of the $SO_2$ emissions at the start of absorption but can result in a large volume of regeneration effluent being returned to the Claus plant. This has the undesired result of increasing the size of the Claus plant and equipment downstream of the locus where the regeneration effluent is reintroduced resulting in significant cost increases.

The rate of regenerator effluent returned to the Claus plant can, as indicated, be reduced by recycling regenerator effluent as diluent back to the regenerator.

Absorber effluent can be used for diluent and the rate of regeneration effluent returned to the Claus plant can be minimized (1) where the Claus plant comprises at least one Claus low-temperature adsorption reactor, (2) where $O_2$ introduced during the regeneration period when ZnS is being converted to ZnO is in an amount about equal to the stoichiometric amount for such conversion, that is, about 3/2 moles $O_2$ for each mole of ZnS to be regenerated, and (3) where the rate of absorber effluent diluent introduced during the regeneration is such that the rate of regeneration effluent during the regeneration period is less than the rate of regeneration effluent returned in the absence of treating in a Claus low-temperature adsorption reactor prior to treatment in a ZnO-containing absorber. As absorber effluent typically comprises residual $H_2$ and CO, the amount of $O_2$ introduced can further include about the stoichiometric amount required for combusting $H_2$ and CO to water and $CO_2$. When using such regeneration, further benefit can be realized by purging in accordance with the invention since using full stream purging can shorten purge time requirements, permitting a longer regeneration period and further reducing the rate of regeneration effluent recycle to the Claus plant.

By use of a low-temperature Claus adsorption reactor, the absorption rate for a ZnO absorber is decreased since the sulfur content of the feed to the absorber is reduced, allowing $O_2$ to be introduced to the regenerator at a lower rate. By introducing $O_2$ during the regeneration period in a total amount effective for oxidizing ZnS to ZnO and, as appropriate, also for combusting any residual $H_2$ and CO to $H_2O$ and $CO_2$, the total volume of $O_2$ is minimized. This permits the rate of absorber effluent introduced as diluent into the regenerator during regeneration to be such that the volume of regeneration effluent returned to the Claus plant during regeneration can be reduced in comparison with the volume where a Claus low-temperature adsorption reactor is not used. Further, as indicated, purging in accordance with the invention can further reduce the rate of return of regeneration effluent to the Claus plant.

Regeneration can be preferably continued until substantially all of the sulfided absorbent is regenerated, for example, until ZnS is substantially reconverted to ZnO. Completion of regeneration can be conveniently determined by monitoring $O_2$ or $SO_2$ content or temperature of the regenerator effluent stream. Preferably, an $O_2$ analyzer is employed downstream of the regenerator to determine the presence of $O_2$ in the regenerator effluent, which is an indication of completion of regeneration.

As will be appreciated by those skilled in the art from the foregoing discussion, materials of construction for the valves, vessels, and piping for the process according to the invention can require special attention. The material preferably has the capability of withstanding high temperatures, for example, in the range of about 800° F. to about 1500° F. or higher while being repeatedly exposed to reducing and oxidizing atmospheres in the presence of sulfur compounds.

Following regeneration, prior to returning the regenerated absorbent for use during the absorption cycle, the regenerated absorbent is treated (purged) by passing a reducing stream in contact with the regenerated, albeit sulfated absorbent (see Examples VI-VII), while another ZnO absorber is downstream receiving the produced $SO_2$ under conditions for removing $SO_2$ from the gaseous stream. The purging can be conducted for a period of time effective for reducing by at least 10% a temporary increase in $SO_2$ emissions otherwise occurring from the plant when freshly regenerated ZnO absorbent is returned to absorption without such purging with a reducing gas while another ZnO absorber is downstream operating under effective absorption conditions. Preferably, the time is effective for reducing $SO_2$ emissions to below about 250 ppm at all times. Most preferably, the time is effective for substantially eliminating the increase in $SO_2$ emissions, that is, for reducing the increase in $SO_2$ emissions above the usual level during absorption by 90% or more from the level occurring where such a reducing gas purge is not used prior to returning to absorption.

The effective purge time can be readily determined by one skilled in the art by monitoring $SO_2$ emissions from a freshly regenerated absorber during at least the increased $SO_2$ emissions period at the start of absorption function, while another absorber is downstream operating under absorption conditions for removing $SO_2$ therefrom, until the $SO_2$ emissions from the freshly regenerated absorber are reduced to a desired level, for example, to below about 250 ppm $SO_2$, preferably to below about 50 ppm $SO_2$. Thereafter the downstream absorber can be removed from absorption function and can be regenerated by introducing a dilute oxygen gas thereinto and the effluent from the now purged, freshly regenerated absorber can be discharged to the atmosphere or, preferably, a portion of that stream can be used as diluent for oxygen during regeneration. Generally it is expected that the purge period in accordance with the invention will be in the range of about 0.3 to about 3 hours, preferably in the range of about 0.5 to about 1 hour.

Preferably, the purge stream can comprise at least a portion of absorber feed. Most preferably, the purge can be effected by using the entire absorber feed, that is, the entire tail gas stream.

Thus, it will be appreciated that purging in accordance with the invention uses a portion of the absorber feed and preferably the entire absorber feed. During the purging period, the ZnO absorbers would be placed in series on absorption, with the freshly regenerated ZnO being in the absorber in the first position. Purging and the beginning of absorption occur concurrently. The effluent from the first absorber is fed to the other absorber to absorb the increase in $SO_2$ emissions. The effluent from the second absorber can then be vented to the atmosphere, thereby eliminating the recycle stream during operation in the purge mode or, alternatively, a slip stream of the effluent from the downstream absorption zone can be recycled to the Claus plant. The purge time in accordance with the invention can be greatly reduced where the entire absorber feed is used because of the larger flow rate of reducing compounds flowing through the freshly regenerated ZnO absorber. Reducing the purge time can allow an increase in the regeneration time and thereby allow a decrease in the recycle rate of effluent during regeneration to the Claus plant, reducing the size of the Claus and the ZnO absorber portions of the plant.

The invention will be further understood by the EXAMPLES which are set forth below.

EXAMPLE I - ABSORPTION: EFFECT OF TEMPERATURE

The effect of temperature on $H_2S$ breakthrough is studied using a laboratory catalyst holder/reactor made from type 304 stainless steel tubing 2" (inch) diameter (O.D.)×0.068" thick wall, 27" long overall. Calculated catalyst volume for 18" depth is 805 ml (milliliters), and the catalyst is supported by a 20 mesh stainless steel screen. Catalyst used is G72D Sulfur Removal Catalyst described above. The reactor is wrapped by six heaters (22 gauge nichrome wire) for preventing radial heat loss, and is insulated with fiberglass. The total flow rate for absorption is 10 l./min (liters/min) and for regeneration 5 l./min. The reactor is placed in a large Blue M ® oven, available from Blue M Electric Company, Blue Island, Ill. All gas flow through the catalyst bed is downflow. Provisions for side draw of gas samples are available near the reactor axis each 1.5" of catalyst depth. The effect of reaction temperatures on $H_2S$ breakthrough time during absorption is illustrated by introducing a feed gas having the following composition into the reactor inlet:

| | |
|---|---|
| $H_2S$ | 0.8 mol % |
| $SO_2$ | 0.4 mol % |
| CO | 1.0 mol % |
| $H_2O$ | 30.0 mol % |
| $N_2$ | 45.8 mol % |
| $H_2$ | 2.0 mol % |
| $CO_2$ | 20.0 mol % |

The feed gas is introduced at 850° F., at 1000° F., and at 1150° F. Breakthrough, defined for purposes of these runs as 50 ppm $H_2S$ in the absorber effluent, and $H_2S$ concentration in the effluent gas at equilibrium, are determined. Results are set forth in the following Table IA.

TABLE IA

| Run | Temp. | Time (Hrs) for Breakthrough | Combined $SO_2$ and $H_2S$ Concentration (Dry Basis) at Equilibrium | Absorption Capacity wt % | mols absorbed/ mols sorbent |
|---|---|---|---|---|---|
| 1 | 850° F. | (Immed. $SO_2$ Breakthrough) | — | — | — |
| 2 | 1000° F. | 25.5 hrs | <10 ppm | 33% | 0.84 |
| 3 | 1150° F. | 27.5 hrs | <20 ppm | 36% | 0.92 |

The results indicate that higher temperatures favor increased absorption capacity as indicated by increased breakthrough times and that lower temperatures favor lower equilibrium concentrations of $H_2S$ in the absorber effluent streams. It is also noted that at 1000° F. and at 1150° F., $SO_2$ present in the inlet stream is substantially completely absorbed or converted to $H_2S$ and absorbed while at 850° F., $SO_2$ appears immediately in the absorber effluent stream. Thus at temperatures at least about 1000° F. and higher hydrogenation of $SO_2$ to $H_2S$ is not required prior to absorption.

EXAMPLE II - ABSORPTION: EFFECT OF TEMPERATURE

The effect of temperature on $H_2S$ breakthrough is further investigated by the following runs using the apparatus described in EXAMPLE I and using an inlet stream having the following composition:

| | |
|---|---|
| $H_2S$ | 1.2 mol % |
| $H_2O$ | 29.5 mol % |
| H | 1.06 mol % |
| CO | 1.01 mol % |
| $CO_2$ | 20.39 mol % |
| $N_2$ | 46.83 mol % |

This inlet stream can be used to simulate the condition where $SO_2$ present in a Claus plant effluent stream is hydrogenated to $H_2S$ prior to absorption. Breakthrough time for various temperatures below 850° F. are determined and are shown in Table IIA below:

TABLE IIA

| Run | Temp. | Time (Hrs) for Breakthrough | Absorption Capacity | |
|---|---|---|---|---|
| | | | wt % | mols/mol sorbent |
| 4 | 625° F. | 3 | 4% | 0.10 |
| 5 | 700° F. | 11 | 14% | 0.36 |
| 6 | 775° F. | 17 | 22% | 0.46 |

These results further confirm the dependence of absorption capacity and breakthrough on absorption temperature.

EXAMPLE III - ABSORPTION: EFFECT OF WATER

The effect of the presence of water vapor on sulfur compound breakthrough is illustrated in part by EXAMPLE I above in which a feed gas stream containing 30.0% water is contacted with a ZnO absorbent and, at 1000° F. to 1150° F., the sulfur compounds in the effluent stream are reduced to 20 ppm or lower.

To further investigate the effect of water on sulfur compound breakthrough using a metal oxide absorbent, the apparatus of EXAMPLE I can be used with a zinc ferrite absorbent containing about 45% iron oxide and about 55% amorphous silica. About 15% of the 45% iron oxide is in the form of zinc ferrite. A feed gas having the following composition is introduced into the reactor inlet at 1000° F.

| | |
|---|---|
| $H_2S$ | 1.2% |
| CO | 1% |
| $H_2$ | 2% |
| $CO_2$[1] | 20% (42%) |
| $H_2O$[1] | 22% (0%) |
| $N_2$ | 53.8% |

[1]$CO_2$ content of inlet stream is increased from 20% to 42% when 22% $H_2O$ is eliminated from the feedstream.

After about 5½ hrs, water is eliminated from the feedstream. The results are shown in Table IIIA below.

TABLE IIIA

| Time (Hrs) | $H_2S$ Concentration in Reactor Effluent |
|---|---|
| 1 | 663 |
| 2.3 | 733 |
| 3.4 | 818 |
| 4.1 | 994 |
| 5.5[1] | 1682 |
| 5.7 | 9 |
| 7.1 | 9 |
| 8.6 | 9 |

The results indicate that the iron oxide (zinc ferrite) absorbent is sensitive to the presence of water in the feedstream as compared with the ZnO of EXAMPLE I. After water is removed from the feedstream, $H_2S$ in the effluent stream is reduced to 9 ppm. These results indicate that ZnO is less sensitive to water than is iron oxide (zinc ferrite).

EXAMPLE IV - REGENERATION

Regeneration is investigated using the apparatus described in EXAMPLE I by passing a dilute air stream in contact with the sulfided absorbent. The effect of temperature on regeneration is investigated. For a dilute air regeneration stream containing about 5 mol % oxygen having an inlet temperature of about 1000° F., the sulfur recovered as $SO_2$ in the regeneration effluent stream is only 0.75 mol %. However, when the inlet temperature is raised to 1150° F. after 5½ hrs, about 3 mol % of sulfur as $SO_2$ appears in the regeneration effluent stream. This higher regeneration temperature is considered preferred to overcome the high activation energy required for Reaction (8) above. During regeneration, the concentration of $SO_2$ in the regeneration effluent stream remains above about 3.5 mol % and the concentration of $O_2$ in the regeneration effluent stream remains about 0 mol %, indicating substantially complete consumption of $O_2$, for about 22 hrs. After about 22 hrs, when regeneration is about complete, $O_2$ starts to breakthrough and $SO_2$ content begins to decline in the regeneration effluent stream.

EXAMPLE V - EFFECT OF PURGE

Effluent tail gas from a Claus sulfur recovery plant having two catalytic reactors operated above the sulfur dewpoint and one Claus low temperature adsorption reactor on-stream at all times is provided to an absorber containing ZnO. A portion of absorber effluent is used as a diluent for $O_2$ to a regenerator containing ZnS. In a first run, upon completion of regeneration, the regenerator and absorber are interchanged in function. Upon interchanging the absorbers, an emissions level from the freshly regenerated catalyst, now functioning as an absorber, of about 350 ppm $SO_2$ is observed. $SO_2$ emissions decline to less than about 50 ppm in about two (2) hours. See FIG. 2. In a second run, upon completion of regeneration and prior to interchanging the absorber and the regenerator, $O_2$ flow into the regenerator is discontinued and the flow of absorber effluent is continued for a period of about two (2) hours. Upon interchanging the absorber and regenerator, $SO_2$ emissions from the absorber are initially less than about 50 ppm and continue at that low level. See FIG. 3. This example indicates that discontinuing $O_2$ flow and continuing absorber effluent, or other reducing gas flow, prior to interchanging an absorber and a regenerator eliminates a temporary increase in $SO_2$ emissions above a baseline level otherwise observed from the absorber after interchanging the two reactors.

EXAMPLE VI - EFFECT OF REGENERATION GAS COMPOSITION ON PURGE

The effect of $SO_2$ levels during regeneration upon purge time requirements at the end of regeneration is investigated by regenerating sulfided absorbent using regeneration feedstreams having various $SO_2$ levels followed by purging with a reducing gas stream having 1.1% $H_2$ and 0.5% CO at a space velocity of about 1. The results are set forth in the following table:

| Run | $SO_2$ in Regeneration Feed | Purge Time (Hours) |
|---|---|---|
| 1 | 0% | 2.0 |
| 2 | 2.9% | 4.5 |
| 3 | 13.2% | >12 |

The results indicate that the $SO_2$ level in the regeneration feed greatly affects the purge time and that increased levels of $SO_2$ during regeneration increase the purge time requirements. The results indicate that the use of absorber effluent or other reducing gas having little or no $SO_2$ present at the inlet is advantageous in reducing purge time.

EXAMPLE VII - EFFECT OF REGENERATION TEMPERATURE ON PURGING/SUBSEQUENT ABSORPTION

Purging runs are made after regeneration at 900° F. and 1150° F. using absorber effluent as the purge gas. The test results show that by purging at 900° F., the increase in $SO_2$ emissions is not removed, whereas by purging at 1150° F., increased $SO_2$ emissions were not observed upon returning to absorption. Based upon these results, it is considered that purging should occur at temperatures from about 1000° F. to about 1200° F. consistent with the temperatures required for hydrogenation of other species in the presence of ZnO absorbent as set forth in Example I above.

EXAMPLE VIII - EFFECT OF $H_2$ ON $SO_2$ EMISSIONS

To investigate the effect of $H_2$ on $SO_2$ emissions, laden ZnO (ZnS) is regenerated at 1150° F. with a regeneration stream having the following inlet composition:

TABLE VIIIA

| | |
|---|---|
| $O_2$ | 5 mol % |
| $NH_3$ | 720 ppm |
| $CO_2$ | 85 mol % |
| $H_2O$ | 10 mol % |

After $SO_2$ emissions decreased to about 50 ppm, 1 mol % $H_2$ was added. $SO_2$ emissions immediately increased to about 450 ppm and then decreased with time. (Note: the $NH_3$ was present to simulate refinery gas in this run; however, the presence of $NH_3$ is not considered to affect the results from the addition of $H_2$ reported herein.)

These results indicate that reducing equivalents such as $H_2$ result in $SO_2$ emissions from a freshly regenerated absorbent. Thus, these results indicate that the effect of reducing gases during the purge period is to cause the production of and allow the removal of $SO_2$ from regenerated sulfated absorbent in the purge effluent stream prior to return to absorption. $SO_2$ removed during purge in regeneration effluent is sent to the Claus plant where sulfur is formed and removed from the process. In this way, $SO_2$ emissions from regenerated absorbent will not appear as emissions from the plant.

EXAMPLE IX - EFFECT OF HYDROGEN SULFIDE ON REDUCING $SO_2$ EMISSIONS

The effect of $H_2S$ on reducing $SO_2$ emissions is investigated by contacting freshly regenerated absorbent with a stream containing $H_2S$ but no $SO_2$. An $SO_2$ emissions peak of about 100 ppm is observed initially, diminishing to about 20 ppm after six (6) hours. These results indicate that $H_2S$ will be effective as a purge gas. It is noted that $H_2S$ will also result in absorbent loading. See Eq. (3).

EXAMPLE X - EFFECT OF METHANE ON REDUCING $SO_2$ EMISSIONS

The effect of methane on reducing $SO_2$ emissions is investigated by contacting absorbent, freshly regenerated with a stream comprising about 13% $SO_2$, with methane for six (6) hours. At the end of the six (6) hours, $SO_2$ emissions are about 2000 ppm. Upon switching to absorption, with a stream comprising 0.39 mol % $H_2S$, 0.16 mol % $SO_2$, 1.69 mol % $H_2$, and 0.26 mol % CO, $SO_2$ emissions of about 8000 ppm are observed which decrease to about 1000 ppm in about 7 hours. Mass spectrographic analysis of the effluent stream during purge with methane indicates that methane is not cracked to $H_2$ and CO at regeneration temperatures of about 1100° F. These results indicate that methane alone is relatively ineffective for purging to reduce $SO_2$ emissions under process conditions.

EXAMPLE XI - ANALYSIS OF SULFIDED ABSORBENT

Samples of fresh absorbent and regenerated absorbent, regeneration having been conducted at 1150° F. the presence of oxygen and 13% $SO_2$ are analyzed by X-ray diffraction. The fresh absorbent is largely crystalline ZnO (zincite). The regenerated absorbent contains ZnO as the major component, with minor concentrations of zinc oxide sulfate $Zn_3O(SO_4)_2$, anhydrite $CaSO_4$, and gahnite, $ZnAl_2O_4$. These results indicate that sulfated compounds may be the cause of $SO_2$ emissions when reduced by contacting with a reducing gas stream.

Figure 2:
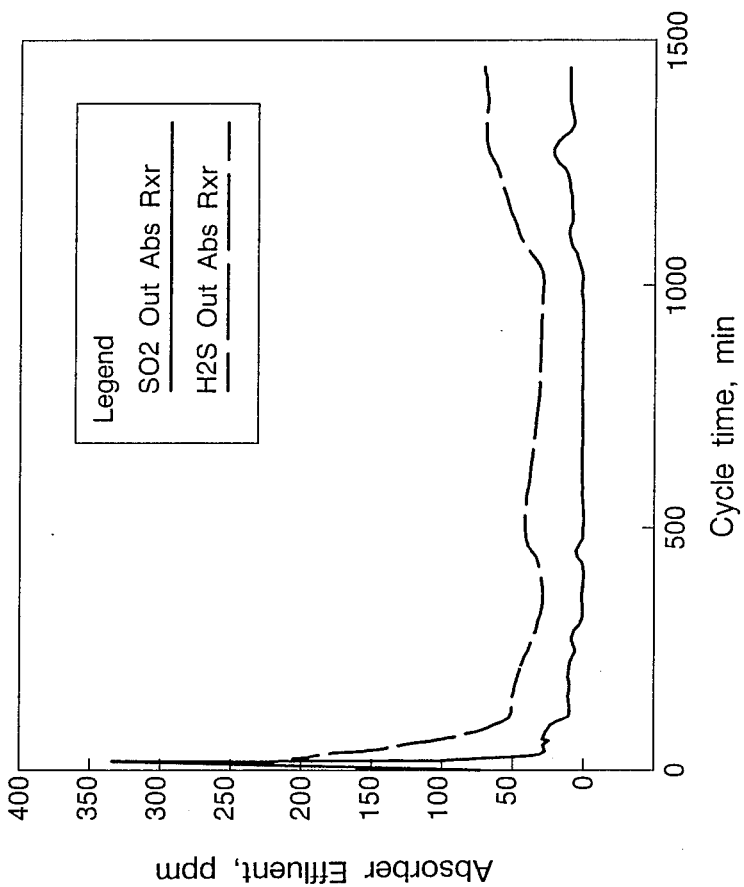
FIG. 2 shows graphically an increase in SO₂ emissions occurring where freshly regenerated absorbent is not purged before absorption with an effective reducing gas.
Figure 3:
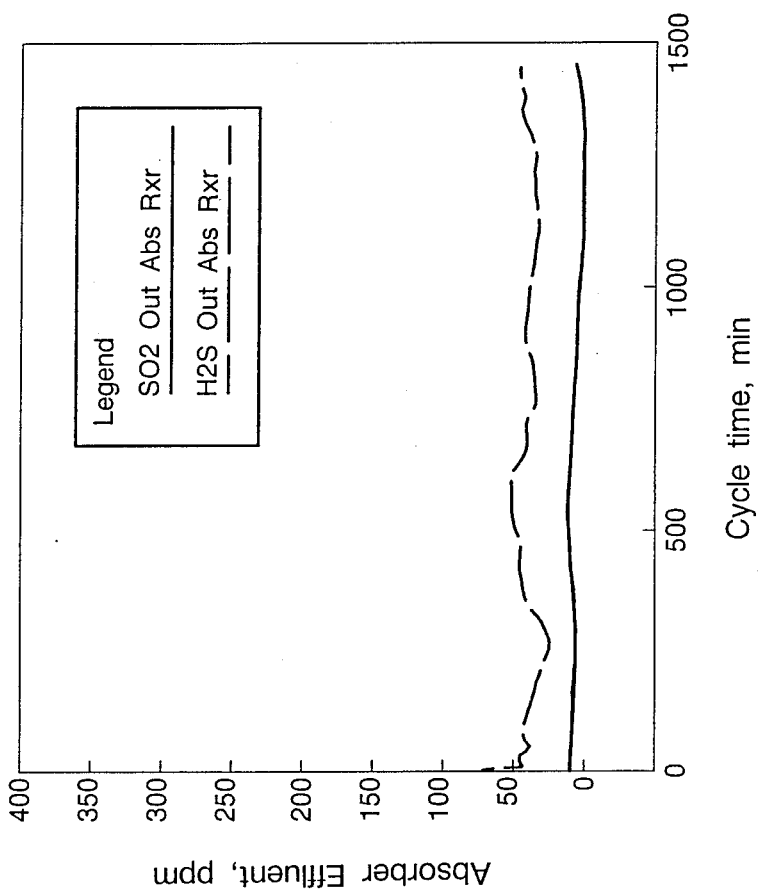
FIG. 3 shows graphically that such an increase in SO₂ emissions as shown in FIG. 2 can be eliminated by purging before absorption with an effective reducing gas. cl DETAILED DESCRIPTION OF THE INVENTION In accordance with the invention, SO₂ emissions are prevented from appearing in effluent from a sulfur recovery plant by steps following regeneration of ZnS to ZnO. The steps comprise operating an absorber containing freshly regenerated ZnO under conditions, including temperature and gas composition, for causing SO₂ emissions to occur from the freshly regenerated absorbent. The effluent from such zone containing the SO₂ is then provided to a second ZnO absorber zone operating under conditions effective for removing such SO₂ in the presence of ZnO and effective reducing species. Thus, the SO₂ emissions are prevented from appearing in emissions from the plant by providing them during an emissions period to another ZnO absorber downstream thereof. Following the emissions period, the ZnS in the downstream absorber zone can be regenerated by introducing dilute molecular oxygen thereinto, producing effluent comprising SO₂, which is returned to a Claus plant from which the tail gas is derived and in which the SO₂ is converted to sulfur and removed from the gas-in-process.

The invention will be further described and further advantages and applications and equivalents will be apparent to those skilled in the art from the description of FIGS. 1 and 2.

Referring now to the drawings and specifically to FIG. 1, FIG. 1 represents an embodiment of the invented process in which absorption of $H_2S$ by the metal oxide absorbent can be carried out at a temperature above about 1000° F., preferably in the range of about 1000° F. to about 1200° F.

An acid gas stream 110 containing $H_2S$ is introduced into a Claus plant furnace 112 and combusted, in the presence of oxygen containing gas, for example, atmospheric air (source not shown), and/or $SO_2$ (provided, for example, via line 111), to produce elemental sulfur, $SO_2$, and water. The elemental sulfur is recovered and unconverted $H_2S$ and $SO_2$ are processed by Claus catalytic sulfur recovery 114, including at least one Claus catalytic reaction zone operated above the sulfur dewpoint and preferably at least one low-temperature Claus adsorption reaction zone. Elemental sulfur is thus produced and removed, for example, by sulfur condensers (shown schematically by the arrow S). A Claus plant effluent stream is removed by line 116 containing sufficient reducing equivalents for reduction of sulfur containing compounds remaining therein to $H_2S$ in the hydrogenation zone or in the absorber zone.

The Claus plant effluent stream in line 116 can then be heated to an effective temperature as described herein. Preferably at least a portion of the heating requirements can be met by passing the Claus plant effluent stream 116 in direct heat exchange with the absorber effluent stream in line 156, for example, in recuperator 158, as indicated schematically by the line marked A. Following heating in recuperator 158, the heated Claus plant effluent stream can be provided by the lines marked B to heater 117 for further heating to above 1000° F., preferably in the range of about 1000°–1200° F. Alternatively, of course, the Claus plant effluent stream 116 can be provided directly (as indicated by the dashed line) and can be heated in heater 117 to a temperature in the range of about 1000° F. to about 1200° F. and introduced by lines 125, 126, valve 126V, and line 130 into first absorber 134. That other provision can be made for heating the Claus plant effluent stream in accordance with the invention will be clear to those skilled in this art.

First absorber 134 contains a ZnO absorbent effective to absorb $H_2S$ present in the inlet stream to produce a sulfided absorbent and to produce an absorber effluent stream 138 containing, for example, less than about 50 ppm $H_2$. Simultaneously with absorption in first absorber 134, after heating to a temperature in the range of 1000° F. to 1200° F., $SO_2$ present in Claus effluent stream 116 can be hydrogenated to $H_2S$ utilizing reducing equivalents present in Claus effluent stream 116 and the resulting $H_2S$ can also be absorbed by the absorbent.

The absorber effluent stream 138 can be conducted by lines 142, valve 142V, lines 152, 156, heat recuperator 158, and line 160 for discharge, for example, to the atmosphere. The heat recuperator 158 provides at least a portion of the heat required for heating the Claus plant effluent stream as described above, or for producing high pressure steam. A portion of the absorber effluent stream can be withdrawn from line 152, by way of, for example, line 154, having valve 154V, for dilution of atmospheric air 172, via compressor 170 and line 168, having valve 168V, to produce a dilute air regeneration stream 166. During regeneration, valves 154V and 168V control the recycle rate to the Claus plant and the rate of regeneration.

The regeneration stream 166 can be heated in heater 174 to regeneration temperatures and can be conducted by lines 176, 178, 180, valve 180V, and line 132 to second absorber 136 shown on regeneration. The heated regeneration stream 176 is thus passed in contact with sulfided absorbent in second absorber 136 to produce a regeneration effluent stream 146 having a reduced $O_2$ content and an increased $SO_2$ and/or sulfur content. Stream 146 is conducted by line 144, valve 144V, heat recuperator 190, compressor 192, and line 111 to the Claus plant furnace 112. Alternatively, the regeneration effluent stream can be introduced into a catalytic one in the Claus plant 114 as indicated by dotted line 111'; however, operation should insure that no free or molecular oxygen is introduced thereby into the catalytic zone.

Absorption is continued in first absorber 134 until prior to or just before $H_2S$ breakthrough occurs in effluent stream 138 from first absorber 134. Preferably, the oxygen content and regeneration stream flow rate is established so that the regeneration time (plus purge and slack time) is equal to absorption time prior to $H_2S$ breakthrough. $H_2S$ breakthrough can be determined by monitoring the $H_2S$ content of first absorber effluent stream 138 until $H_2S$ content can exceed a predetermined limit which can be, for example, that suitable to meet emission requirements for discharge of stream 160.

Prior to placing the first absorber on regeneration, purge of the second absorber zone can be effected by discontinuing $O_2$ flow to the second absorber, for example, by closing valve 168V, and by stopping flow of absorber effluent for diluent by closing valve 154V. Then, by opening valve 128V, the tail gas can be provided to the second absorption zone. During this period, valves 194V and 182V should be open, and valves 196V and 126V should be closed. (If only partial flow is used for purge, valve 126V can be partially closed to control the rate.) Effluent from the second absorption zone containing $SO_2$ produced during the emissions period can then be provided by line 144 having valve 144V, line 194 having valve 194V, and line 182 having valve 182V to the first absorption zone 134 in which the $SO_2$ is removed in the presence of the ZnO and effective reducing species. Effluent from the first absorption zone 134 can then by line 138, 142, having valve 142V be exhausted. A portion of the effluent from the first absorption zone can be provided to the Claus furnace by line 198, valve 198V, and line 111 to maintain a steady rate of gas to the Claus plant. Alternatively, valve 196V in line 196 could be partially opened to provide a constant rate of recycle to the Claus plant from the effluent of absorber 136. This method, however, has the disadvantage of providing a varying $SO_2$ content to the Claus plant.

Thereafter, first absorber 134 can be placed on regeneration and second absorber 136 can be placed on absorption by closing valves 126V (if not already closed), 142V, 180V, 144V, 194V, 196V, and 198V in their respective lines 126, 142, 180, 144, 194, 196, and 198, and by opening valves 128V, 182V, 140V, and 148V in the respective lines 128, 182, 140, and 148. Valve 194V in line 194 (which can be closed during normal operation) can be utilized to minimize pressure shock during valve switching.

It will be appreciated by those skilled in the sulfur recovery art that a Claus plant tail gas cleanup process is provided which is not sensitive to water content in the effluent stream and which is capable of continuously maintaining low levels of emission while reducing costs. Other embodiments and applications in the spirit of the invention and within the scope of the appended claims will be apparent to those skilled in the art from the description herein.

What is claimed is:

1. In a method for absorbing at least $H_2S$ from a Claus plant effluent stream by (1) sulfidization of ZnO, thereby producing ZnS, (2) the ZnS then being regenerated to ZnO producing $SO_2$ in the presence of molecular oxygen $O_2$ and (3) the ZnO returned to absorbing at least $H_2S$ from the Claus plant effluent stream, said method additionally comprising the steps of:
    (a) following the step of regeneration of ZnS to ZnO in a first reactor, passing at least a portion of the total Claus plant effluent stream in contact with regenerated ZnO producing a purge effluent comprising increased amounts of sulfur dioxide $SO_2$ relative to $SO_2$ concentrations in the Claus plant effluent; and
    (b) passing the purge effluent in contact with ZnO in a second reactor under conditions including temperature and composition for removing $SO_2$ therefrom.

2. The method of claim 1 further comprising:
    continuing (a) and (b) for a period of time for reducing $SO_2$ levels in the purge effluent to less than about 250 ppm.

3. The method of claim 2 wherein the period of time is effective for reducing $SO_2$ levels in the purge effluent to about 50 ppm.

4. The method of claim 1 further comprising:
    regenerating ZnS to ZnO by diluting $O_2$ with effluent produced during regeneration of ZnS to ZnO.

5. The method of claim 1 further comprising:
    regenerating ZnS to ZnO by diluting $O_2$ with effluent produced from absorbing at least $H_2S$ in the presence of ZnO producing ZnS.

6. The method of claim 4 further comprising:
    returning effluent produced during regeneration to a Claus plant.

7. In a method for removing at least sulfur dioxide $SO_2$ from a Claus plant effluent stream comprising $SO_2$ and reducing species effective for converting $SO_2$ to $H_2S$ in the presence of an effective ZnO absorbent, said method comprising (1) sulfidization of ZnO, thereby producing ZnS, (2) the ZnS then being regenerated to ZnO producing $SO_2$ in the presence of molecular oxygen $O_2$, and (3) the ZnO returned to absorbing at least $SO_2$ from said Claus plant effluent stream, said method additionally comprising the steps of:

(a) following the step of regeneration of ZnS to ZnO in a first reactor, passing at least a portion of the Claus plant effluent stream in contact with regenerated ZnO producing a purge effluent comprising increased amounts of $SO_2$ relative to $SO_2$ concentrations in the Claus plant effluent; and (b) passing the purge effluent in contact with ZnO in a second reactor under conditions including temperature and gas composition for removing $SO_2$ therefrom.

8. The method of claim 7 further comprising:
continuing (a) and (B) for a period of time for reducing $SO_2$ levels in the purge effluent to less than about 250 ppm.

9. The method of claim 8 wherein the period of time is effective for reducing $SO_2$ levels in the purge effluent to about 50 ppm.

10. The method of claim 7 further comprising:
regenerating ZnS to ZnO by diluting $O_2$ with effluent produced during regeneration of ZnS to ZnO.

11. The method of claim 7 further comprising:
regenerating ZnS to ZnO by diluting $O_2$ with effluent produced from absorbing at least $H_2S$ in the presence of ZnO producing ZnS.

12. The method of claim 10 further comprising:
returning effluent produced during regeneration to a Claus plant.

* * * * *